United States Patent
Nakata

(10) Patent No.: US 9,313,361 B2
(45) Date of Patent: Apr. 12, 2016

(54) INFORMATION PROCESSING APPARATUS FOR DETERMINING A PRINTING CONDITION FOR MEETING MATERIALS

(71) Applicant: KYOCERA Document Solutions Inc., Osaka-shi, Osaka (JP)

(72) Inventor: Yasuharu Nakata, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/137,604

(22) Filed: Dec. 20, 2013

(65) Prior Publication Data

US 2014/0176998 A1  Jun. 26, 2014

(30) Foreign Application Priority Data

Dec. 26, 2012 (JP) ................................ 2012-282280

(51) Int. Cl.
| | | |
|---|---|---|
| G06F 3/12 | (2006.01) | |
| H04N 1/32 | (2006.01) | |
| H04N 1/00 | (2006.01) | |

(52) U.S. Cl.
CPC .......... *H04N 1/32496* (2013.01); *G06F 3/1206* (2013.01); *G06F 3/126* (2013.01); *G06F 3/1232* (2013.01); *G06F 3/1288* (2013.01); *H04N 1/00278* (2013.01)

(58) Field of Classification Search
None
See application file for complete search history.

(56) References Cited

U.S. PATENT DOCUMENTS

| 6,452,692 | B1* | 9/2002 | Yacoub | 358/1.15 |
|---|---|---|---|---|
| 8,079,090 | B2* | 12/2011 | Okada | 726/27 |
| 8,305,611 | B2* | 11/2012 | Takiyama | 358/1.15 |
| 2005/0154642 | A1* | 7/2005 | Wiechers | 705/21 |
| 2009/0067000 | A1 | 3/2009 | Takiyama | |

(Continued)

FOREIGN PATENT DOCUMENTS

| JP | 06075725 A | 3/1994 |
|---|---|---|
| JP | 2007295245 A | 11/2007 |

(Continued)

OTHER PUBLICATIONS

European Patent Office, Extended European Search Report of EP13198917, Germany, Jun. 3, 2014, 7 pages.

*Primary Examiner* — Paul F Payer
(74) *Attorney, Agent, or Firm* — Alleman Hall McCoy Russell & Tuttle LLP

(57) ABSTRACT

An information processing apparatus includes connection portion, first acquisition portion, printing condition determination portion, second acquisition portion, and first selection portion. Connection portion connects the information processing apparatus to a plurality of image forming apparatuses. First acquisition portion acquires management data in which meeting information relating to the content of meeting is associated with material information relating to material used for the meeting. Printing condition determination portion determines printing condition to be applied to printing process for the material, based on the meeting information acquired by first acquisition portion. Second acquisition portion acquires printing condition information relating to printing condition that can be set in each of the plurality of image forming apparatuses. First selection portion selects, from among the plurality of image forming apparatuses, image forming apparatus that satisfies the printing condition determined by printing condition determination portion, based on the printing condition information acquired by second acquisition portion.

13 Claims, 9 Drawing Sheets

(56) References Cited

U.S. PATENT DOCUMENTS

| | | |
|---|---|---|
| 2009/0122338 A1 | 5/2009 | Yoshida |
| 2010/0073705 A1 | 3/2010 | Cain |
| 2010/0253969 A1 | 10/2010 | Morales |

FOREIGN PATENT DOCUMENTS

| | | |
|---|---|---|
| JP | 2009122954 A | 6/2009 |
| JP | 2010146232 A | 7/2010 |
| JP | 2012128518 A | 7/2012 |

* cited by examiner

Fig. 4

| | DATE/TIME | TITLE | CATEGORY | MEMBER | PLACE | SUMMARY | MATERIAL DATA | DISTRIBUTION |
|---|---|---|---|---|---|---|---|---|
| 34A | 2012/8/24 13:30-15:00 | meeting with company A | visitor | ** | 6F reception room | ... | contract.txt | ○ |
| 34B | 2012/8/27 15:00-17:00 | in-house project meeting | in-house meeting | ** | 4F meeting room | ... | meeting document.txt | × |
| 34C | 2012/9/3 14:30-16:00 | meeting with company B | visitor | ** | 6F reception room | ... | estimate.doc slides.ppt | ○ ○ |
| | ... | ... | ... | ... | ... | ... | ... | ... |

34

INFORMATION PROCESSING APPARATUS FOR DETERMINING A PRINTING CONDITION FOR MEETING MATERIALS

INCORPORATION BY REFERENCE

This application is based upon and claims the benefit of priority from the corresponding Japanese Patent Application No. 2012-282280 filed on Dec. 26, 2012, the entire contents of which are incorporated herein by reference.

BACKGROUND

The present disclosure relates to an information processing apparatus and an information processing system each configured to select a specific image forming apparatus from among a plurality of image forming apparatuses connected to each other via connecting portions.

Conventionally, in an environment where a plurality of image forming apparatuses are connected to a network such as a LAN, an image forming apparatus has been well known which can cause another image forming apparatus installed in a meeting place where a meeting is held, to perform printing of materials such as pictures and documents to be used in the meeting. This image forming apparatus includes an information acquisition portion that acquires, from a management apparatus, schedule information indicating the place where the meeting is held, and installation position information indicating the position where the another image forming apparatus is installed. The image forming apparatus transmits data of the materials to the another image forming apparatus installed in the meeting place indicated by the schedule information acquired by the information acquisition portion.

All the plurality of image forming apparatuses connected to the network do not necessarily have the same function. For example, an image forming apparatus capable of color printing or an image forming apparatus capable of monochromatic printing only may be connected to the network. Further, all the plurality of image forming apparatuses do not necessarily contain print sheets of the same type or size. For example, an image forming apparatus in which so-called one-side printed sheets (print sheets having one sides on which images have already been formed) are contained in a sheet feed tray may be connected as an apparatus dedicated to printing of one-side printed paper sheets. Further, an image forming apparatus in which special print sheets such as coated paper sheets or heavy paper sheets are contained in a sheet feed tray may be connected as an apparatus dedicated to documents to be submitted to the outside of a company. Therefore, in the conventional art in which an image forming apparatus located near the place where a meeting is held is selected based on the schedule (date and time) of the meeting and material data is transmitted to the selected image forming apparatus, even if the selected image forming apparatus is one that inappropriately prints the material data, print-out is forcibly performed by the image forming apparatus.

SUMMARY

An information processing apparatus according to an aspect of the present disclosure includes a connection portion, a first acquisition portion, a printing condition determination portion, a second acquisition portion, and a first selection portion. The connection portion connects the information processing apparatus to a plurality of image forming apparatuses. The first acquisition portion acquires management data in which meeting information relating to the content of a meeting is associated with material information relating to a material used for the meeting. The printing condition determination portion determines a printing condition to be applied to a printing process for the material, based on the meeting information acquired by the first acquisition portion. The second acquisition portion acquires printing condition information relating to a printing condition that can be set in each of the plurality of image forming apparatuses. The first selection portion selects, from among the plurality of image forming apparatuses, an image forming apparatus that satisfies the printing condition determined by the printing condition determination portion, based on the printing condition information acquired by the second acquisition portion.

An information processing system according to another aspect of the present disclosure includes a plurality of image forming apparatuses and a server device which are connected to each other via connection portions. The server device includes a storage portion. The storage portion stores therein management data in which meeting information relating to the content of a meeting is associated with material information relating to a material used for the meeting. At least one of the plurality of image forming apparatuses includes a first acquisition portion, a printing condition determination portion, a second acquisition portion, a first selection portion, and a print-out portion. The first acquisition portion acquires the management data by reading the management data from the storage portion of the server device via the connection portion. The printing condition determination portion determines a printing condition to be applied to a printing process for the material, based on the meeting information acquired by the first acquisition portion. The second acquisition portion acquires printing condition information relating to printing conditions that can be set in the plurality of image forming apparatuses, respectively. The first selection portion selects, from among the plurality of image forming apparatuses, an image forming apparatus that satisfies the printing condition determined by the printing condition determination portion, based on the printing condition information acquired by the second acquisition portion. The print-out portion transmits, to the image forming apparatus selected by the first selection portion, printing data including the material information and the determined printing condition, to cause the image forming apparatus to execute printing.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a diagram showing meeting schedule data managed by the management server.

DETAILED DESCRIPTION

Hereinafter, an embodiment of the present disclosure will be described based on the drawings.

Figure 1:
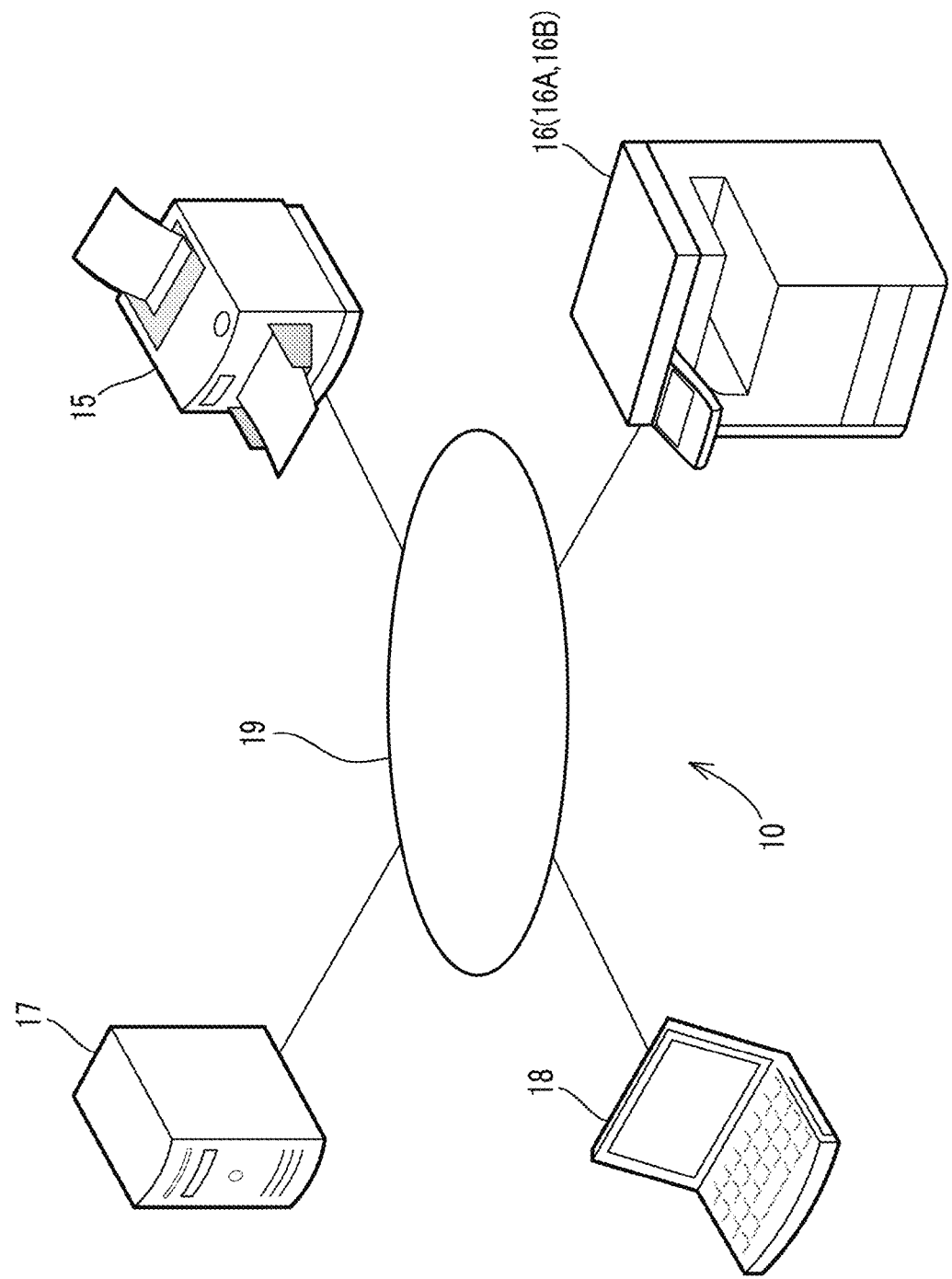
FIG. 1 is a network diagram showing a configuration of a print processing system according to an embodiment of the present disclosure.

FIG. 1 is a network diagram showing a configuration of a print processing system 10 according to an embodiment of the present disclosure. The print processing system 10 is an example of an information processing system described in claims. As shown in FIG. 1, the print processing system 10 is configured to have a printer 15, two multifunction peripherals 16 (16A and 16B), a management server 17, and a personal computer 18. The printer 15 and the multifunction peripherals 16 (16A and 16B) are examples of an image forming apparatus described in claims. The management server 17 is an example of a server device described in claims. These devices are connected so as to be data-communicable with each other via a communication network 19 such as a LAN or a WAN that complies with IEEE 802.3 standard. The communication network 19 is an example of a connecting portion described in claims. Hereinafter, the configurations of the printer 15, the multifunction peripherals 16, the management server 17, and the personal computer 18 will be described in detail.

[Printer 15]

Figure 2A:
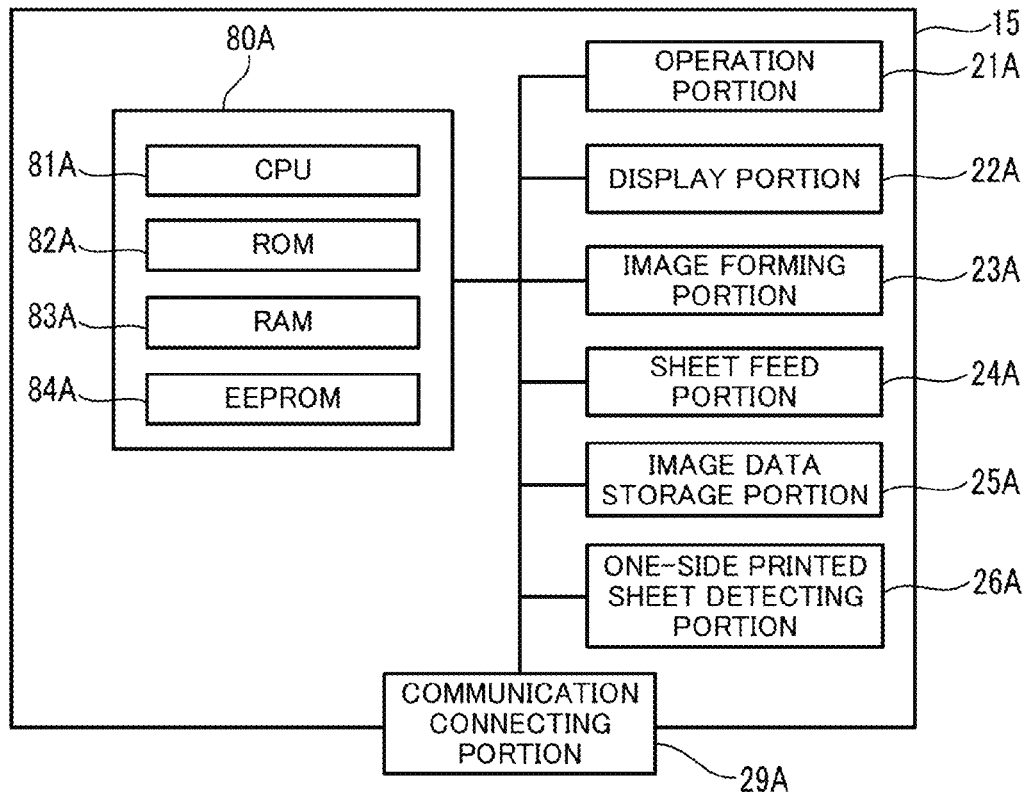
FIG. 2A is a block diagram showing a configuration of a printer included in the print processing system shown in FIG. 1.

The printer 15 forms an image on a print sheet based on printing data that is externally input. As shown in FIG. 2A, the printer 15 is composed of a control portion 80A, an operation portion 21A, a display portion 22A, an image forming portion 23A, a sheet feed portion 24A, an image data storage portion 25A, a one-side printed sheet detecting portion 26A, and a communication connecting portion 29A.

The control portion 80A performs overall control for the printer 15. The control portion 80A includes a CPU 81A, a ROM 82A, a RAM 83A, an EEPROM 84A, and the like, which are connected to each other via an internal bus. The CPU 81A executes various kinds of control programs for controlling the printer 15, and performs calculations in data processing. The control programs are stored in the ROM 82A. A printing process and the like in the printer 15 are controlled by the control programs being executed by the CPU 81A. The RAM 83A temporarily stores therein data read from the image data storage portion 25A, and data input to the communication connecting portion 29A. The data stored in the RAM 83A is processed by the CPU 81A, and the processed data is transferred to the image forming portion 23A and/or the image data storage portion 25A according to need. The EEPROM 84A stores therein information about various kinds of settings in the printer 15. For example, sheet information about the type and size of recording sheets contained in the sheet feed portion 24A is stored in the EEPROM 84A. The sheet information is set based on: information input by a user via the operation portion 21A; a result of detection by a sheet size sensor that detects the sheet size; a result of detection by the one-side printed sheet detecting portion 26A; and the like. The control portion 80A may be composed of an electronic circuit such as an integrated circuit (ASIC or DSP).

The operation portion 21A includes buttons, switches, and the like, and performs various kinds of settings and instructions to the printer 15. The display portion 22A is a liquid crystal panel (so-called touch panel) that allows the user to perform touch-key input, and displays various kinds of information such as messages and screens. The display portion 22A is not limited to a touch panel.

The image forming portion 23A forms an image on a specified print sheet by using a print material such as a toner. The image forming portion 23A forms an image by electrophotography, for example. The image forming portion 23A includes a photosensitive drum, a charging portion, a developing portion, a transfer portion, and a fixing portion. A toner image is developed, by the developing portion, on the photosensitive drum charged at a uniform potential by the charging portion, and the toner image is transferred to the print sheet by the transfer portion. The toner image transferred to the print sheet is fixed to the print sheet by the fixing portion, and then the print sheet is discharged to an external tray or the like. The image forming portion 23A is not limited to the electrophotographic type, but may be an inkjet recording type or may be another recording type or another print type.

The sheet feed portion 24A feeds a print sheet toward the image forming portion 23A. The sheet feed portion 24A includes: one or a plurality of sheet feed trays for containing print sheets of various sizes; and a sheet feed roller that takes out a print sheet from the sheet feed tray and feeds the print sheet. When a plurality of sheet feed trays are provided, print sheets of different sizes or print sheets of different types are contained in the respective sheet feed trays. The sheet feed portion 24A includes a sheet size sensor that detects the size of the print sheets contained in the sheet feed tray. An output signal from the sheet size sensor is transferred to the control portion 80A. Based on the output signal, the control portion 80A recognizes the size of the print sheets contained in the sheet feed tray. The size of the print sheets is stored as sheet information in the EEPROM 84A.

The one-side printed sheet detecting portion 26A detects whether the print sheets contained in the sheet feed tray of the sheet feed portion 24A are print sheets having one sides on which images have already been formed (hereinafter referred to as "one-side printed sheets"). The one-side printed sheet detecting portion 26A is composed of, for example, a concentration sensor that detects the concentration of the sides, on which no image is formed, of the print sheets contained in the sheet feed tray. An output signal from the concentration sensor is transferred to the control portion 80A. Based on the output signal, the control portion 80A recognizes whether the print sheets contained in the sheet feed tray are one-side printed sheets. For example, the control portion 80A determines that the print sheets are one-side printed sheets when an output value of the concentration sensor is equal to or larger than a predetermined concentration value. Information indicating whether the print sheets are one-side printed sheets is stored as the sheet information in the EEPROM 84A.

The image data storage portion 25A stores therein large-volume data such as image data included in the printing data input from the communication connecting portion 29A. The image data storage portion 25A is an HDD, for example.

The communication connecting portion 29A is a communication interface that realizes transmission/reception of data to/from the devices connected via the communication network 19. The communication connecting portion 29A is an NIC (Network Interface Card), for example.

[Multifunction Peripheral 16]

Figure 2B:
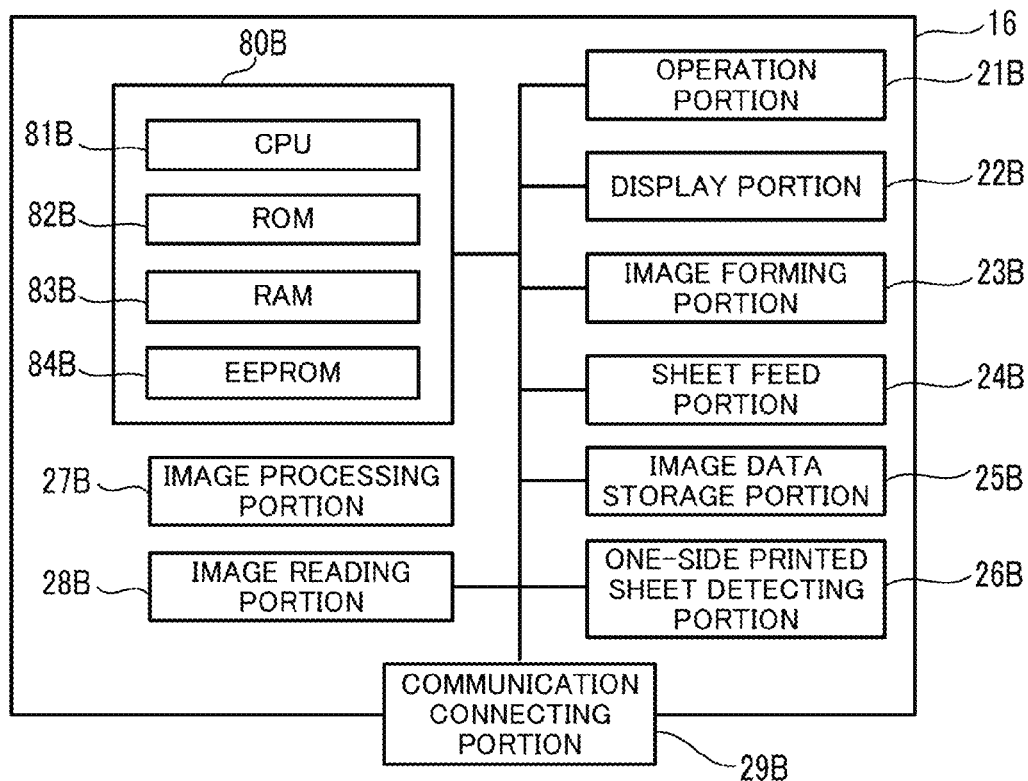
FIG. 2B is a block diagram showing a configuration of a multifunction peripheral included in the print processing system shown in FIG. 1.

The multifunction peripheral 16 is an image forming apparatus having functions of a printer, a copy machine, a scanner, a facsimile, and the like. In the present embodiment, two multifunction peripherals 16 (16A and 16B) having the same configuration are connected to the communication network 19. As shown in FIG. 2B, the multifunction peripheral 16 is composed of a control portion 80B, an operation portion 21B, a display portion 22B, an image forming portion 23B, a sheet feed portion 24B, an image data storage portion 25B, a one-side printed sheet detecting portion 26B, an image processing portion 27B, an image reading portion 28B, and a communication connecting portion 29B. Since the configurations of the control portion 80B, the operation portion 21B, the display portion 22B, the image forming portion 23B, the sheet feed portion 24B, the image data storage portion 25B, the one-side printed sheet detecting portion 26B, and the communication connecting portion 29B are identical to the configurations of those included in the printer 15, detailed description thereof will be omitted hereinafter.

The control portion 80B of the multifunction peripheral 16 performs overall control for the multifunction peripheral 16. Specifically, the control portion 80B controls an image forming process in the image forming portion 23B, and an image reading process by the image reading portion 28B. Further, the control portion 80B controls a print-out process described later, which is executed along a flowchart shown in FIG. 7. The print-out process will be described later.

The image reading portion 28B optically reads an image from a document sheet placed on a contact glass (document sheet table) that is not shown, and an image from a document sheet conveyed by an ADF that is not shown. The image reading portion 28B is composed of a light source that scans a surface-to-be-read of a document, and an image sensor such as a CCD or a CIS that receives reflected light from the surface-to-be-read and converts the light into an electric signal. The electric signal obtained by the image sensor is output to the image processing portion 27B.

The image processing portion 27B generates image data based on the electric signal from the image reading portion 28B. Further, the image processing portion 27B performs predetermined image processing for the generated image data. The image processing portion 27B performs, for example, gamma correction and noise elimination according to a predetermined algorithm. The image processing portion 27B is composed of an ASIC, for example.

[Management Server 17]

Figure 3A:
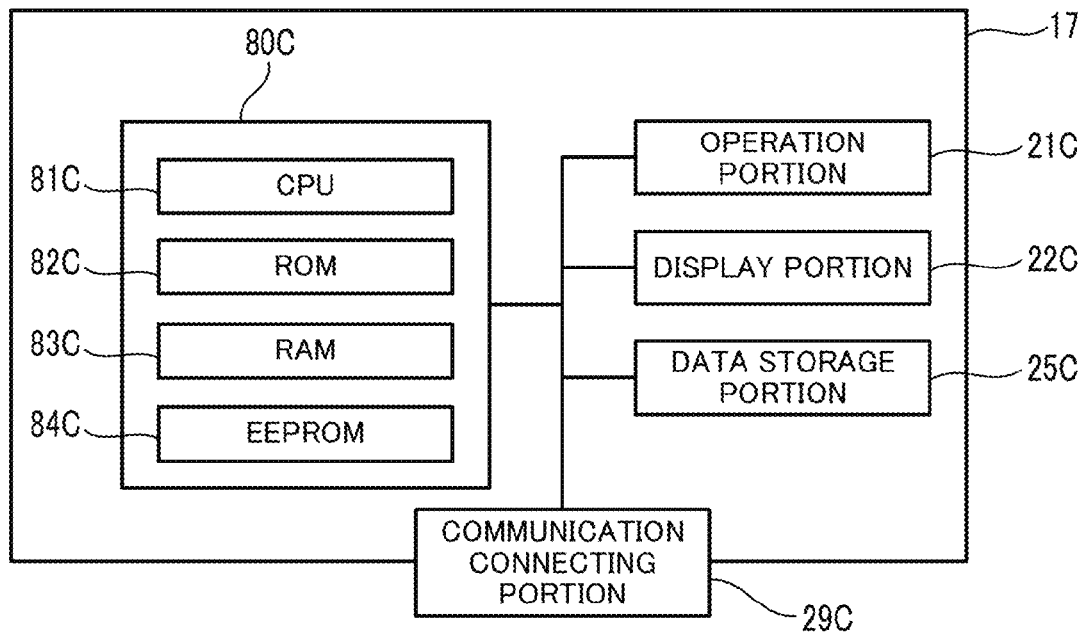
FIG. 3A is a block diagram showing a configuration of a management server included in the print processing system shown in FIG. 1.

The management server 17 is a server device that converts information of each device connected to the communication network 19 into a database for management, and converts a meeting schedule shown in FIG. 4 into a database for management. As shown in FIG. 3A, the management server 17 is composed of a control portion 80C, an operation portion 21C, a display portion 22C, and a data storage portion 25C.

The control portion 80C performs overall control for the management server 17. The control portion 80C has the same configuration as that of the above-mentioned control portion 80A, that is, includes a CPU 81C, a ROM 82C, a RAM 83C, an EEPROM 84C, and the like. The CPU 81C executes various kinds of control programs for controlling the management server 17. Further, the CPU 81C executes various kinds of applications that cause the management server 17 to realize a function of managing a meeting schedule registered in meeting schedule data 34 described later, and a function of managing device management data described later. The control programs are stored in the ROM 82C. The RAM 83C temporarily stores therein data read from the data storage portion 25C, and data input to a communication connecting portion 29C. The EEPROM 84C stores therein information about various kinds of settings in the management server 17.

The operation portion 21C is composed of buttons, switches, and the like, and performs various kinds of settings and instructions for the management server 17. The operation portion 21C is a keyboard, for example. The display portion 22C is a monitor such as a liquid crystal panel, and displays screens used for the various kinds of applications, input information, and the like.

The meeting schedule data 34 converted into a database (refer to FIG. 4) and material data to be used in the meeting are stored in the data storage portion 25C. The data storage portion 25C is an example of a storage portion described in claims. As shown in FIG. 4, the meeting schedule data 34 is management data in which meeting information relating to the content of a meeting is associated with material information relating to materials to be used in the meeting. The meeting schedule data 34 is an example of management data described in claims. The meeting information includes: the date and time of the meeting; the title (subject) of the meeting; the category of the meeting; members to attend the meeting; the place where the meeting is held; and the summary of the meeting. These pieces of information are registered in the meeting schedule data 34. The material information is a filename (including a filename extension) of material data obtained by converting a material to be used in the meeting into electronic data. That is, in the meeting schedule data 34, the filename for identifying the material data is registered in association with the meeting information. The actual material data is stored in another storage region in the data storage portion 25C, and address information indicating where the material data is stored is linked to the filename. The material data need not be stored in the data storage portion 25C. As long as the address information that specifies where the material data is stored is managed by the meeting schedule data 34, the material data may be stored in another device connected to the communication network 19.

Further, as shown in FIG. 4, in the meeting schedule data 34, if a plurality of materials are to be used in a meeting, material information (filename) of each of the materials is registered in association with the corresponding meeting information. Specifically, in a meeting schedule 34C, two filenames, i.e., "estimate.doc" and "slides.ppt", relating to the material data are registered. Further, in general cases, a material for a meeting is not distributed as a handout but projected on a screen. Therefore, in the meeting schedule data 34, a column for necessity of distribution is provided as information indicating whether the material needs to be distributed. If the material needs to be distributed, "○" is registered. If the material need not be distributed, "×" is registered.

Further, device management data obtained by converting information about all the devices connected to the communication network 19 into a database is stored in the data storage portion 25C. For example, various kinds of information about the printer 15, the multifunction peripherals 16 (16A and 16B), and the personal computer 18, which are connected to the communication network 19, are registered in the device management data for management. Specifically, the printing abilities of the printer 15 and the multifunction peripherals 16

(16A and 16B), the installation positions thereof, user IDs authorized to use the printer 15 and the multifunction peripherals 16, and the like are managed as the device management data. Further, information about the user of the personal computer 18 and the user ID are also managed as the device management data. The printing ability corresponds to, for example, the printing resolution, the printing speed, the type of print sheets contained (one-side printed sheets, coated paper sheets, plain paper sheets, etc.), and the like.

[Personal Computer 18]

Figure 3B:
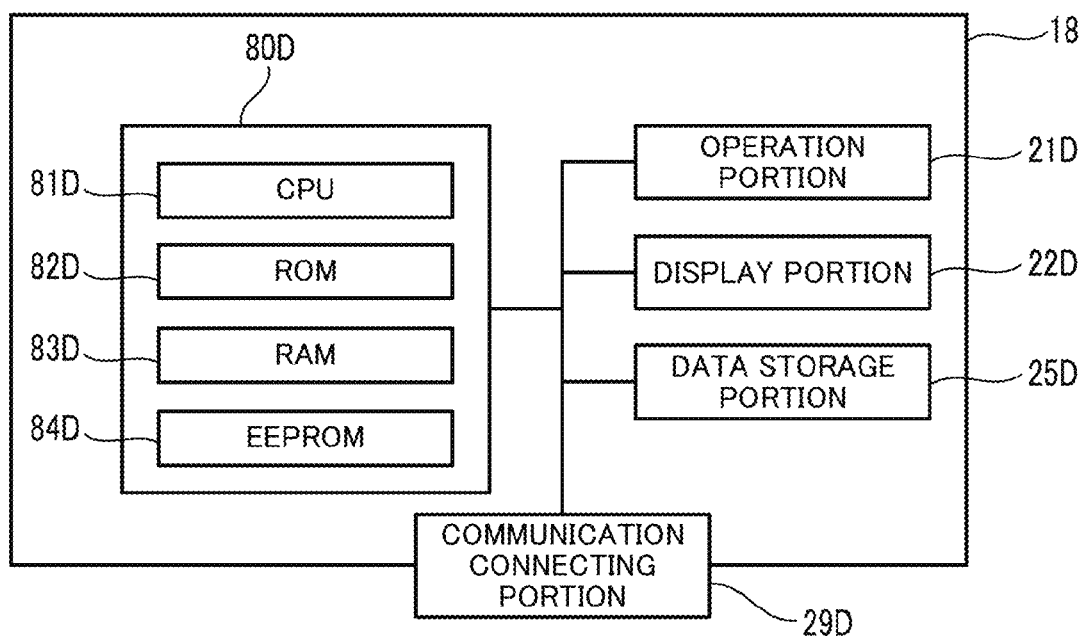
FIG. 3B is a block diagram showing a configuration of a personal computer included in the print processing system shown in FIG. 1.

The personal computer 18 is an information processing apparatus that causes the devices connected to the communication network 19 to execute predetermined processes. Specifically, the personal computer 18 causes the printer 15 and the multifunction peripherals 16 connected to the communication network 19 to perform print-out, and accesses the management server 17 to update the meeting schedule data 34 (refer to FIG. 4). As shown in FIG. 3B, the personal computer 18 is composed of a control portion 80D, an operation portion 21D, a display portion 22D, and a data storage portion 25D. Since the configurations of the operation portion 21D, the display portion 22D, the data storage portion 25D, and a communication connecting portion 29D are identical to the configurations of those included in the management server 17, detailed description thereof will be omitted hereinafter.

The control portion 80D performs overall control for the personal computer 18. The control portion 80D has the same configuration as that of the above-mentioned control portion 80A, that is, is composed of a CPU 81D, a ROM 82D, a RAM 83D, an EEPROM 84D, and the like. The CPU 81D executes various kinds of control programs for controlling the personal computer 18. The control programs are stored in the ROM 82D. The RAM 83D temporarily stores therein data read from the data storage portion 25D, and data input to the communication connecting portion 29D. The EEPROM 84D stores therein information about various kinds of settings in the personal computer 18.

Further, the CPU 81D executes: an application that causes the personal computer 18 to realize an updating function of updating the meeting schedule data 34 (refer to FIG. 4); an application for forming material data to be used in a meeting or the like; and a printer driver for performing print-out. The applications and the printer driver are stored in the data storage portion 25D. The material data formed by the application is converted by the printer driver into printing data of page description language (PDL) such as PCL, and the printing data is transmitted to the printer 15 or the like via the communication connecting portion 29D.

Figure 5:
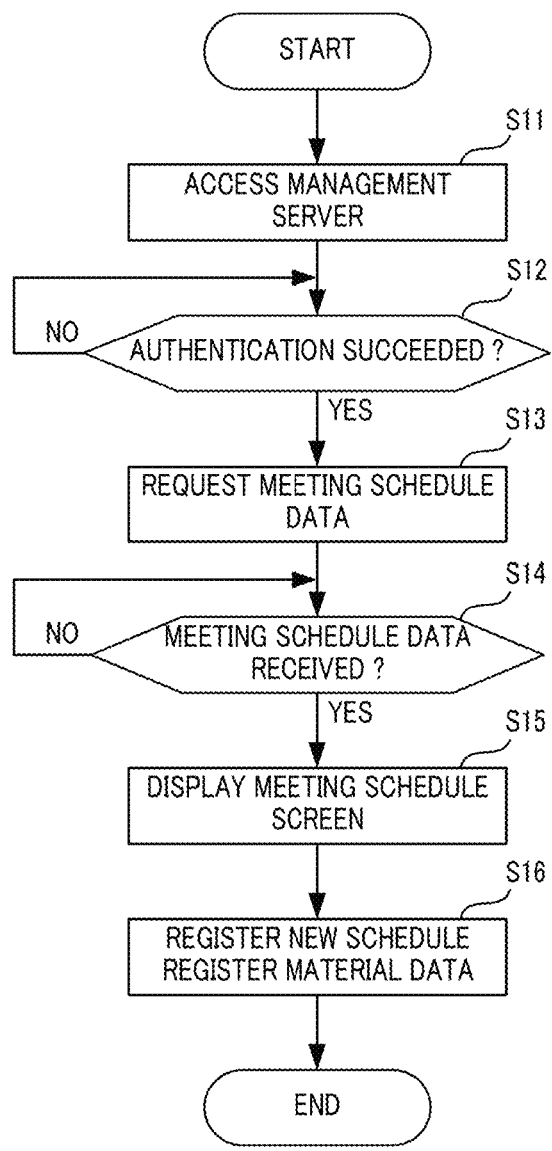
FIG. 5 is a flowchart showing an example of a procedure of a schedule registration process executed by a control portion of the personal computer.

The meeting schedule data 34 managed by the management server 17 can be updated through a necessary operation performed on the management server 17, and can also be updated via the personal computer 18 as described below. Hereinafter, a procedure of a process of updating, via the personal computer 18, the meeting schedule data 34 stored in the management server 17 will be described with reference to a flowchart shown in FIG. 5. The updating process is executed by the control portion 80D of the personal computer 18. In FIG. 5, S11, S12, . . . represent the numbers of steps in the procedure.

When the user inputs, via the operation portion 21D of the personal computer 18, an instruction to execute the updating process, the control portion 80D outputs a communication request to the management server 17 via the communication network 19, and accesses the management server 17 (S11). Thereafter, when specific information such as a user ID is input in response to an input request transmitted from the management server 17, an authentication process is performed on the management server 17 side. If the input user ID has been registered in the device management data of the management server 17, a notification indicating success of authentication is transmitted to the personal computer 18. The control portion 80D determines whether the notification has been received, thereby to determine whether the authentication has succeeded (S12).

When the authentication has succeeded in step S12, the control portion 80D transmits an acquisition request to the management server 17 to acquire the meeting schedule data 34 from the management server 17 (S13). Upon receiving the acquisition request, the management server 17 reads the meeting schedule data 34 stored in the data storage portion 25C, and transmits the meeting schedule data 34 to the personal computer 18. Thus, the personal computer 18 acquires the meeting schedule data 34.

Upon receiving the meeting schedule data 34 from the management server 17 (Yes in S14), the control portion 80D causes the display portion 22D to display the meeting schedule data 34, and activates a user interface such as a GUI to accept inputs of a new meeting schedule, new material data, and meeting schedule updating information (S15). When the new meeting schedule and material data or the updating information is input via the operation portion 21D, the control portion 80D registers these pieces of information in the meeting schedule data 34 (S16). The newly registered meeting schedule data 34 is transmitted to the management server 17, and the meeting schedule data 34 stored in the management server 17 is updated to the latest meeting schedule data 34.

Figure 6A:
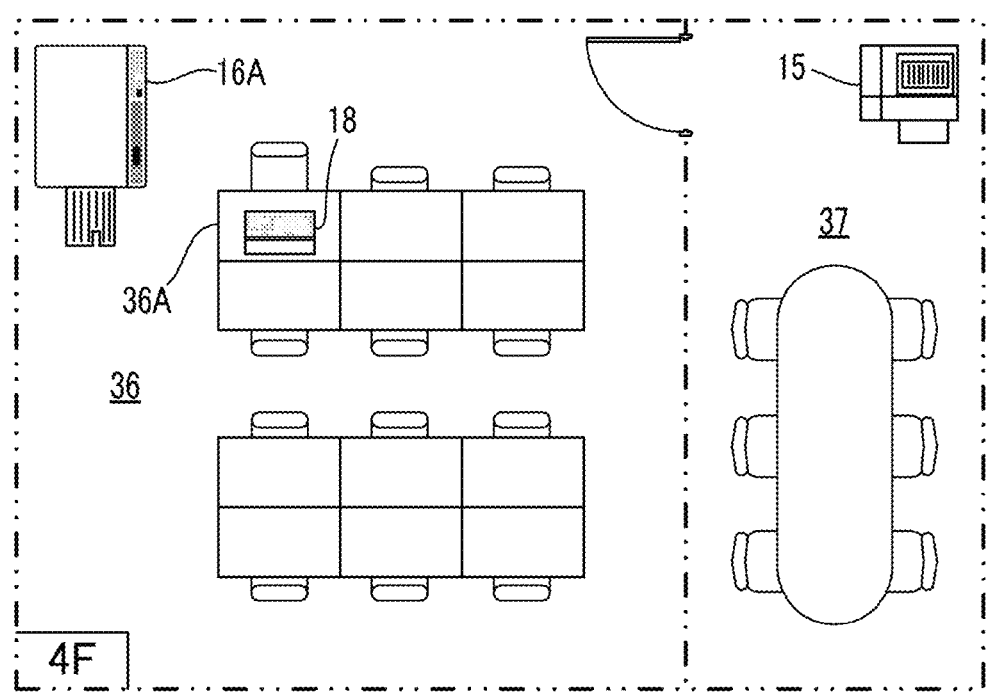
FIG. 6A and FIG. 6B are floor layout diagrams for explaining positions where the printer and the multifunction peripheral are installed, respectively.
Figure 6B:
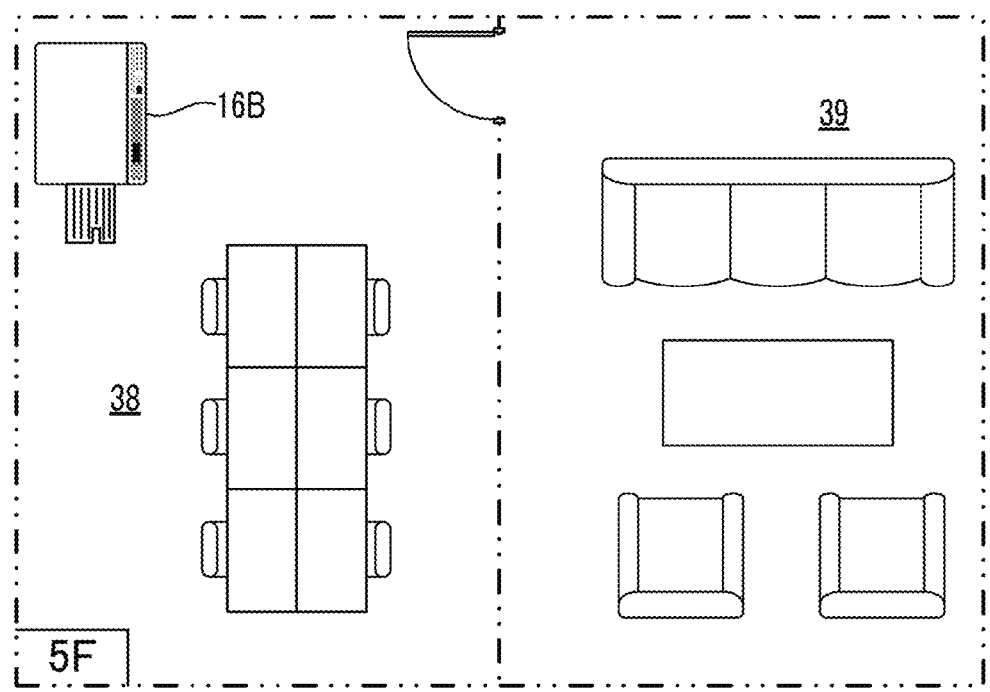

The print processing system 10 thus configured is generally used in an office. In this case, the printer 15, the two multifunction peripherals 16 (16A and 16B), the management server 17, and the personal computer 18 are not installed together in one place, but installed in different positions on office floors as shown in layout diagrams of FIGS. 6A and 6B. Specifically, as shown in FIG. 6A, the multifunction peripheral 16A is installed in a workroom 36 on the 4th floor of the office, and the printer 15 is installed in a meeting room 37 on the same floor. Further, as shown in FIG. 6B, the multifunction peripheral 16B is installed in a workroom 38 on the 5th floor of the office. On the 5th floor, besides the workroom 38, there is a reception room 39 for receiving guests. No printing device is installed in the reception room 39. When the printer 15 and the multifunction peripherals 16A and 16B are thus installed, for example, a user at a desk near the multifunction peripheral 16A can grasp the printing ability of the multifunction peripheral 16A located near the user and the type of print sheets contained therein. However, the user, in many cases, cannot grasp the printing ability of the printer 15 installed in the different room on the same floor, the printing ability of the multifunction peripheral 16B installed on the different floor, and the types of print sheets contained therein.

Figure 7:
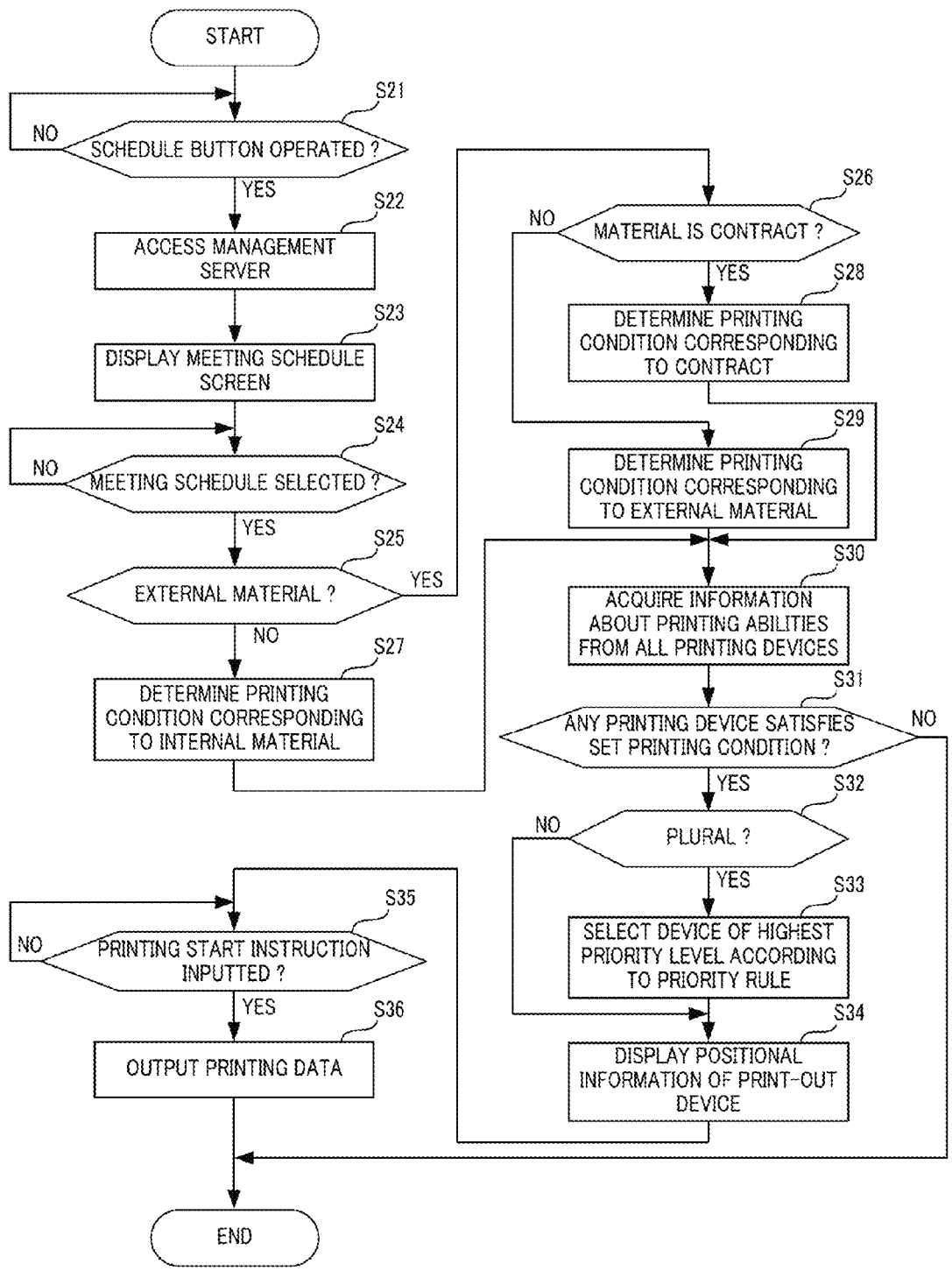
FIG. 7 is a flowchart showing an example of a procedure of a printing process executed by a control portion of the multifunction peripheral.

According to the print processing system 10 of the present embodiment, even in such installation environment, it is possible to specify a printing device offering the most suitable printing condition for the printing process of a material to be printed, and perform print-out. Hereinafter, an example of a procedure of a print-out process of printing, from the multifunction peripheral 16A, a material registered in the meeting schedule data 34 of the management server 17 will be described with reference to a flowchart shown in FIG. 7. The print-out process is executed by the control portion 80B of the multifunction peripheral 16A. In FIG. 7, S21, S22, . . . represent the numbers of steps in the procedure. In the following description, it is assumed that, in the layout diagram shown in FIG. 6A, the personal computer 18 is installed on a desk 36A, and a user of the personal computer 18 operates the multifunction peripheral 16A located closest to the personal computer 18 to instruct the print-out process. Hereinafter, the printer 15 and the two multifunction peripherals 16 (16A and 16B) are also referred to as printing devices.

Figure 8A:
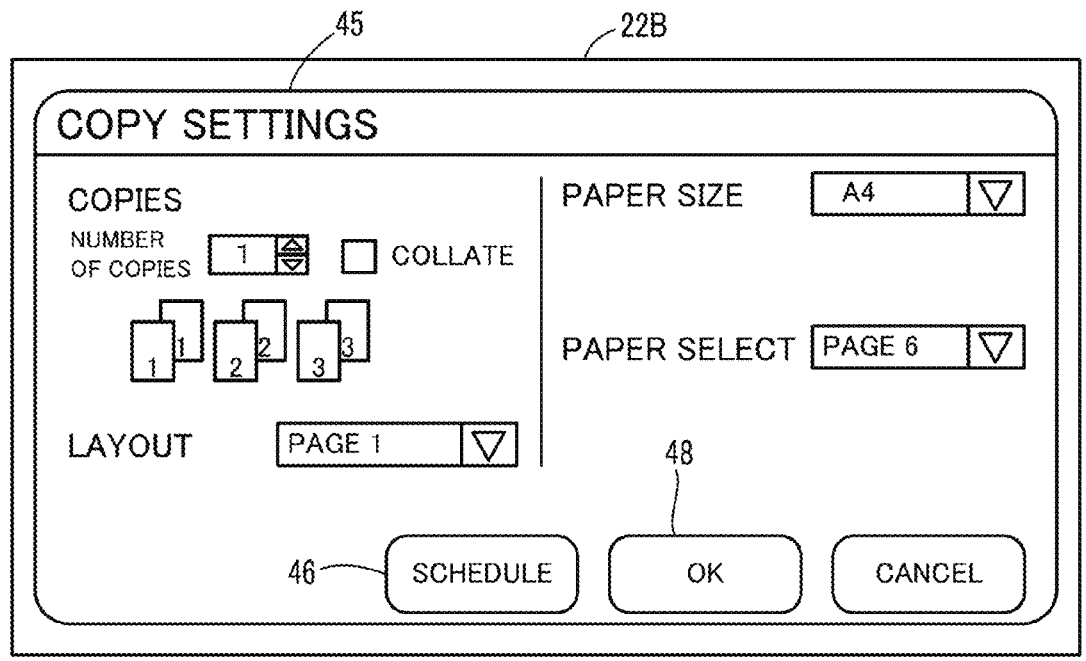
FIG. 8A and FIG. 8B are diagrams showing examples of copy setting screens displayed on a display portion of the multifunction peripheral.

When a schedule button 46 on a copy setting screen 45 (refer to FIG. 8A) displayed as an initial screen on the display portion 22B is operated by the user (S21), the control portion 80B accesses the management server 17 and acquires the meeting schedule data 34 (refer to FIG. 4) from the management server 17 via the communication network 19 (S22). The steps to acquire the meeting schedule data 34 are identical to the above-mentioned steps S12 to S14 (refer to FIG. 5), and therefore, are not shown in FIG. 7. Specifically, the control portion 80B outputs a communication request to the management server 17 via the communication network 19, and accesses the management server 17. Thereafter, when specific information such as a user ID is input in response to an input request transmitted from the management server 17, an authentication process is performed on the management server 17 side. If the input user ID has been registered in the device management data of the management server 17, a notification indicating success of authentication is transmitted to the personal computer 18. The control portion 80B determines whether the notification has been received, thereby to determine whether the authentication has succeeded. When the authentication has succeeded, the control portion 80B transmits an acquisition request to the management server 17 to acquire the meeting schedule data 34 from the management server 17. Upon receiving the acquisition request, the management server 17 reads the meeting schedule data 34 stored in the data storage portion 25C, and transmits the meeting schedule data 34 to the multifunction peripheral 16A. Thereby, the multifunction peripheral 16A acquires the meeting schedule data 34. The control portion 80B that performs the process of acquiring the meeting schedule data 34 as described above is an example of a first acquisition portion described in claims. If the meeting schedule data 34 acquired in the past is stored in an EEPROM 84B of the multifunction peripheral 16B, the control portion 80B may acquire the meeting schedule data 34 not from the management server 17 but from the EEPROM 84B.

Figure 8B:
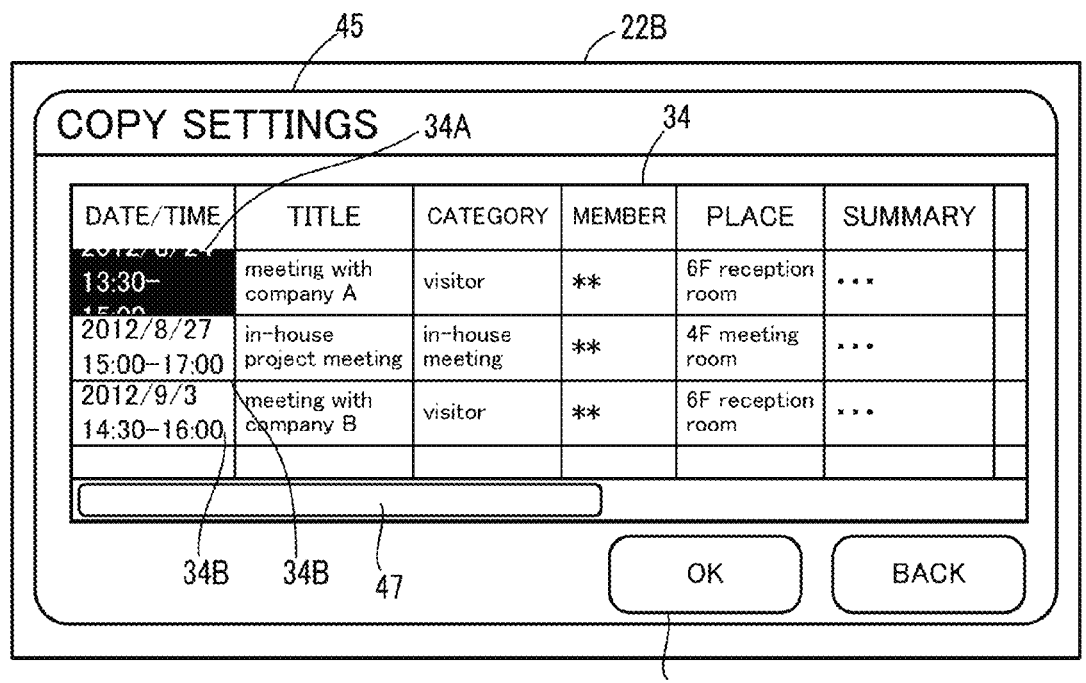

Upon receiving the meeting schedule data 34 from the management server 17, the control portion 80B causes the display portion 22B to display the meeting schedule data 34 as shown in FIG. 8B, and activates a user interface such as a GUI to accept an instruction input by the user (S23). Although FIG. 8B shows the state where only a part of the meeting schedule data 34 is displayed on the display portion 22B, all the contents of the meeting schedules can be displayed by a scroll key 47 being operated.

The user specifies a meeting schedule having material information that he/she wants to print, on the meeting schedule data 34 displayed on the display portion 22B, and operates an OK button 48. Then, the control portion 80B determines that the material data linked to the material information included in the meeting schedule is selected as a printing target (S24). Thereafter, the control portion 80B goes to step S25. FIG. 8B shows a case where a meeting schedule 34A of August 24, 2012 is selected, and the date/time cell of the meeting schedule 34A is highlighted. The following description is given on the assumption that the meeting schedule 34A is selected.

In steps S25 to S29, the control portion 80B executes, based on the meeting information included in the meeting schedule 34A, a printing condition determining process of determining a printing condition to be applied when the material to be used in the meeting of the meeting schedule 34A is printed. The control portion 80B that performs the printing condition determining process according to the procedure of steps S25 to S29 is an example of a printing condition determination portion described in claims.

Specifically, the control portion 80B determines, based on the meeting information included in the meeting schedule 34A, whether the meeting material to be used in the meeting is an external material (S25). The external material is a material to be submitted to visitors, staff members of another company, and the like, and therefore, to be printed out under a printing condition that provides a relatively high image quality. This determination is performed based on the terms used for the meeting information (title, category, place, summary, etc.). In the present embodiment, the following determination rule is set for the determination process in step S25. That is, according to the determination rule, the meeting material is determined to be an external material when any of the following conditions is satisfied: the name of another company is shown in the title or summary column; the term "visitor" is shown in the category column; and the place where the meeting is held is the reception room 39. Of course, the meeting material may be determined to be an external material not only when one of the above conditions is satisfied but also when some of the conditions are satisfied. In the case where the meeting schedule 34A is selected, the meeting material is determined to be an external material according to the above determination rules.

When it is determined in step S25 that the meeting material is an external material, the control portion 80B determines whether the meeting material is a contract or an important document equivalent to a contract (S26). This determination is performed based on the meeting information and the material information. In the present embodiment, regarding the determination process in step S26, the following determination rule is set. That is, when a condition that the term "contract" is included in the meeting information and the material information is satisfied, the meeting material is determined to be a contract or the like. In the case where the meeting schedule 34A is selected, the meeting material is determined to be an external material and a contract, according to the above decision rule.

When it is determined in step S26 that the meeting material is a contract, the control portion 80B determines that the meeting material is an external material and is required to have a higher image quality. In other words, the control portion 80B determines that the meeting material is a material to be printed on special print sheets (e.g., coated paper sheets used for contracts). In this case, the control portion 80B determines a printing condition suitable for a printing process that provides the high image quality required for a contract (S28). Specifically, in order to prevent the print from easily disappearing, the control portion 80B determines the type of print sheets (an example of the printing condition) used for printing of the meeting material to be "coated paper sheets", and determines a set value of printing resolution to be "1200 dpi or higher".

When it is determined in step S25 that the meeting material is not an external material but an in-house material, the control portion 80B determines a printing condition suitable for a printing process for the in-house material (S27). The in-house material is a material that is not externally submitted, such as a material for an in-house meeting, and may be printed out under a printing condition of a low image quality without causing any problem. Such an in-house material may be printed on the other sides of one-side printed paper sheets. Therefore, in step S27, the control portion 80B determines a printing condition suitable for a printing process that provides the low image quality required for the in-house material. Specifically, the control portion 80B determines the type of print sheets (an example of the printing condition) used for printing of the meeting material to be "one-side-printed paper sheets".

When it is determined in step S26 that the meeting material is not a contract, the control portion 80B determines that the meeting material is an external material but need not be printed on special print sheets. In this case, the control portion 80B determines a printing condition suitable for a printing process for the external material (excluding a contract and the like) (S29). Specifically, the control portion 80B determines the type of print sheets (an example of the printing condition) used for printing of the meeting material to be "plain paper sheets", and determines a set value of printing resolution to be "600 dpi or higher".

When the printing condition has been determined through steps S25 to S29, the control portion 80B performs a process of acquiring printing condition information about a printing condition that can be set in each of the printing devices (the printer 15, the multifunction peripheral 16A, and the multifunction peripheral 16B) connected to the communication network 19 (S30). The control portion 80B that performs this process is an example of a second acquisition portion described in claims. The printing condition information is information indicating the printing ability of each printing device. In the present embodiment, the printing condition information is registered in the device management data stored in the EEPROM 84C in the management server 17. Accordingly, in step S30, the control portion 80B accesses the management server 17, and acquires the device management data from the EEPROM 84C.

In the present embodiment, it is assumed that the maximum printing resolution of the multifunction peripherals 16A and 16B is 1200 dpi or higher, and the maximum printing resolution of the printer 15 is 600 dpi. In addition, it is assumed that coated paper sheets and plain paper sheets are contained in two sheet feed trays of the multifunction peripheral 16A, respectively, one-side printed sheets and plain paper sheets are contained in two sheet feed trays of the multifunction peripheral 16B, respectively, and only one-side printed sheets are contained in a sheet feed tray of the printer 15. Under such circumstances, when the meeting schedule 34A is selected in step S24, the control portion 80B advances the processing as follows.

In next step S31, the control portion 80B performs a process of selecting, from among the plurality of printing devices on the communication network 19, a printing device that satisfies any of the printing conditions determined in steps S27 to S29 (hereinafter referred to as set printing condition). Specifically, the control portion 80B determines whether there is a printing device that satisfies the set printing condition among the plurality of printing devices on the communication network 19. The control portion 80B that performs this determination process is an example of a first selection portion described in claims. This determination is made depending on whether the printing ability or the like of each printing device, which is registered in the device management data, satisfies the set printing condition. When the meeting schedule 34A is selected in step S24, since the set printing condition is "coated paper sheets" and "1200 dpi or higher", the multifunction peripheral 16A is specified as a printing device that satisfies this condition.

Figure 9:
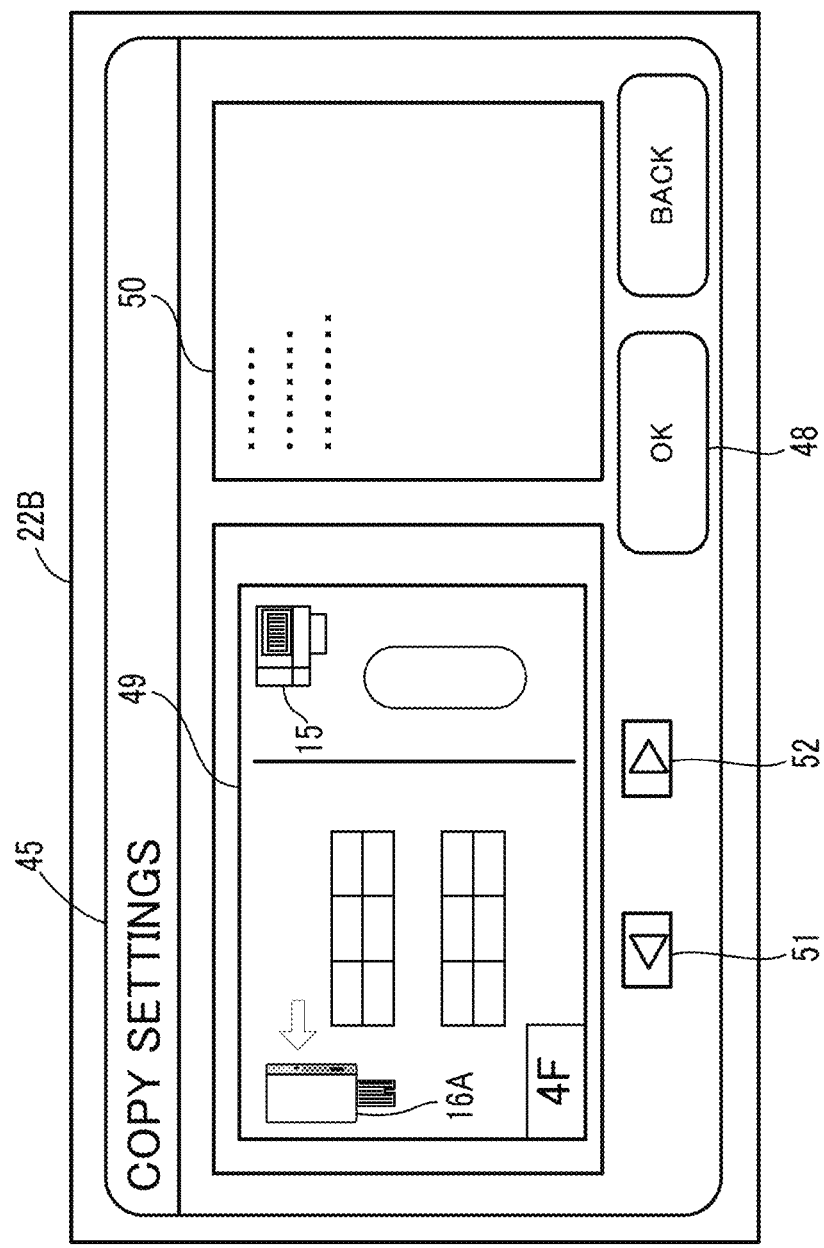
FIG. 9 is a diagram showing an example of a copy setting screen displayed on the display portion of the multifunction peripheral.

If it is determined in step S31 that there is no printing device that satisfies the set printing condition, the series of process steps are ended without performing the print-out process. On the other hand, if it is determined in step S31 that there is at least one printing device that satisfies the set printing condition, the control portion 80B determines whether the number of the printing devices is single or plural (S32). Upon determining that the number of the printing devices is single, the control portion 80B sets, as a print-out device, the printing device that satisfies the set printing condition, and outputs identification information indicating the printing device so as to inform the user of the identification information indicating the printing device (S34). In the present embodiment, the control portion 80B outputs, as the identification information, positional information indicating the position where the printing device that satisfies the set printing condition is installed, to the display portion 22B, so that the positional information is displayed on the display portion 22B. Specifically, when the printing device is the multifunction peripheral 16A, the control portion 80B causes the display portion 22B to display layout information 49 of the floor where the multifunction peripheral 16A is installed as shown in FIG. 9, and further, performs indication (using an arrow or blinking) to specify the multifunction peripheral 16A. When the meeting schedule 34A is selected in step S24, the layout information 49 indicating the position of the multifunction peripheral 16A is output to the display portion 22B. The displayed layout information 49 can be switched to, for example, layout information of another floor, by arrow keys 51 and 52 being operated. The control portion 80B that performs such display is an example of a notification portion described in claims. The notification portion may be, for example, a message column 50 provided in the display portion 22B, and the message of the positional information may be displayed in the message column 50. Alternatively, the positional information may be sent, together with the message, to an address specified by the user ID.

On the other hand, when it is determined in step S32 that the number of the printing devices satisfying the set printing condition is plural, the control portion 80B acquires positional information of each of the printing devices from the device management data, and selects one print-out device from among the plurality of printing devices, based on the positional information (S33). Specifically, according to a predetermined priority rule, the control portion 80B sets, as a print-out device, a printing device having the highest priority level among the plurality of printing devices. For example, the priority rule is that the closer a printing device is to the position where a printing device operated by the user is installed, the higher the priority level assigned to the printing device is. That is, when a plurality of printing devices satisfy the set condition, the control portion 80B acquires the information of the installation position of each printing device, which is included in the device management data, and determines, as a print-out device, a printing device closest to the printing device operated by the user. Thereafter, the control portion 80B causes the display portion 22B to display the positional information indicating the position where the selected printing device is installed (S34). The control portion 80B that performs the process of acquiring the information of the installation position from the device management data is an example of a third acquisition portion described in claims. The control portion 80B that sets the print-out device based on the acquired positional information is an example of a second selection portion described in claims.

Subsequently, when an instruction to start printing is input by the user via the operation portion 21B (S35), the control portion 80B outputs printing data including the material information and the set printing condition to the printing device selected in step S33, thereby to cause the printing device to perform the printing process. The control portion 80B that outputs the printing data is an example of a print-out portion described in claims.

In the print processing system 10 configured as described above, when the user prints out the meeting material from the multifunction peripheral 16A, a printing condition suitable for the meeting material is determined, and a printing device that satisfies the printing condition is automatically specified among the three printing devices, i.e., the printer 15 and the two multifunction peripherals 16 (16A and 16B). Thus, the user does not have to think about the printing condition suitable for the meeting material. Further, the above configuration saves the user the trouble of selecting a printing device suitable for the meeting material from among the plurality of printing devices, and thus the usability for the user is improved.

In the above embodiment, the operation for print-out is performed from the multifunction peripheral 16A. However, the present disclosure is also applicable to a case where the operation for print-out is performed from the multifunction peripheral 16B having the same configuration as the multifunction peripheral 16A. Further, if the control portion 80D of the personal computer 18 having no image forming portion is caused to realize the processing functions executed by the control portion 80B of the multifunction peripheral 16A, the print-out process can be executed from the personal computer 18.

Further, by previously storing the meeting schedule data 34 and the device management data in the EEPROM 84B or the like serving as a storage portion, the multifunction peripheral 16A may be regarded as an information processing apparatus of the present disclosure, that is, an information processing apparatus in which the image forming portion 23B is provided. In this case, the control portion 80B reads and acquires the meeting schedule data 34 and the device management data from the EEPROM 84B.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus, comprising:
a connection portion configured to connect the information processing apparatus to a plurality of image forming apparatuses;
a display portion configured to display a print setting screen and a predetermined operation button;
a first acquisition portion configured to, when the predetermined operation button displayed on the display portion is operated, acquire management data including a plurality of meeting schedules in each of which meeting information relating to content of a meeting is associated with material information relating to a meeting material used for the meeting, and display the acquired management data on the display portion;
a printing condition determination portion configured to, when a predetermined meeting schedule is specified from among the management data displayed on the display portion, determine, as a printing target, a meeting material that is associated with the specified meeting schedule, and determine, based on the meeting information and the material information included in the specified meeting schedule, a type of print sheet as a printing condition to be applied to a printing process for the meeting material that is associated with the specified meeting schedule,
wherein the printing condition determination portion determines, based on the meeting information included in the specified meeting schedule, whether the meeting material to be used in the meeting is an external material or an in-house material, and upon determining that the meeting material is an external material, determines, based on the material information included in the specified meeting schedule, whether the external material is a predetermined document type that specifies a higher printing quality than for the in-house material and the external material,
wherein the printing condition determination portion determines a first type of print sheet according to a first printing quality required for the meeting material that is determined as not an external material, determines a second type of print sheet according to a second printing quality required for the meeting material that is determined as an external material, and determines a third type of print sheet according to a third printing quality required for the meeting material that is determined as a predetermined document type among external materials, the third printing quality being a higher printing quality than the first printing quality and the second printing quality,
a second acquisition portion configured to acquire printing condition information relating to a printing condition that can be set in each of the plurality of image forming apparatuses;
a first selection portion configured to select, from among the plurality of image forming apparatuses, an image forming apparatus that satisfies the printing condition determined by the printing condition determination portion, based on the printing condition information acquired by the second acquisition portion, and
a print-out portion configured to transmit, to the image forming apparatus selected by the first selection portion, printing data including the material information and the determined print condition, to cause the image forming apparatus to execute printing.

2. The information processing apparatus according to claim 1, wherein
the meeting information includes at least one of: a subject of the meeting; a category of the meeting; date and time when the meeting is held; members who attend the meeting; a place where the meeting is held; and a summary of the meeting; which are included in the meeting information, and
wherein the printing condition determination portion determines the meeting material to be an external material when any of the following conditions is satisfied: a name of another company is shown in a title or summary column; a term indicating a visitor is included in a category column; and the place where the meeting is held is a reception room, determines the meeting material to be a predetermined document type when a name of the meeting material included in the material information includes a term indicating that the meeting material is a predetermined document type, and determines a type of print sheet according to a printing quality required for the meeting material as determined.

3. The information processing apparatus according to claim 1, further comprising:
a storage portion configured to store the management data therein, wherein
the first acquisition portion reads out and acquires the management data from the storage portion.

4. The information processing apparatus according to claim 1, wherein
a server device having a storage portion configured to store the management data therein is connected to the information processing apparatus via the connection portion, and
the first acquisition portion reads out and acquires the management data from the storage portion of the server device via the connection portion.

5. The information processing apparatus according to claim 1, further comprising:
a third acquisition portion configured to acquire positional information relating to an installation position of each of the plurality of image forming apparatuses; and
a second selection portion configured to, when a plurality of image forming apparatuses that satisfy the type of print sheet are selected from among the plurality of image forming apparatuses by the first selection portion, select one image forming apparatus based on the positional information acquired by the third acquisition portion.

6. The information processing apparatus according to claim 5, wherein
the print-out portion transmits the printing data to the image forming apparatus selected by the second selection portion to cause the image forming apparatus to execute printing.

7. The information processing apparatus according to claim 1, further comprising:
a notification portion configured to notify identification information indicating the image forming apparatus to which the printing data is transmitted from the print-out portion.

8. The information processing apparatus according to claim 1, wherein
one of the plurality of image forming apparatuses is provided inside a main body of the information processing apparatus.

9. An information processing system, wherein
a plurality of image forming apparatuses and a server device are connected to each other via connection portions,
the information processing system includes a display portion configured to display a print setting screen and a predetermined operation button,
the server device includes a storage portion configured to store therein management data including a plurality of meeting schedules in each of which meeting information relating to content of a meeting is associated with material information relating to a material used for the meeting, and
at least one of the plurality of image forming apparatuses comprises:
a first acquisition portion configured to, when the operation button displayed on the display portion is operated, acquire the management data by reading the management data from the storage portion of the server device via the connection portion by which the image forming apparatus is connected to the server device, and display the acquired management data on the display portion;
a printing condition determination portion configured to, when a predetermined meeting schedule is specified from among the management data displayed on the display portion, determine, as a printing target, a meeting material that is associated with the specified meeting schedule, and determine, based on the meeting information and the material information includes in the specified meeting schedule, a type of print sheet as a printing condition to be applied to a printing process for the meeting material that is associated with the specified meeting schedule,
wherein the printing condition determination portion determines, based on the meeting information included in the specified meeting schedule, whether the meeting material to be used in the meeting is an external material or an in-house material, and upon determining that the meeting material is an external material, determines, based on the material information included in the specified meeting schedule, whether the external material is a predetermined document type that specifies a higher printing quality than for the in-house material and the external material,
wherein the printing condition determination portion determines a first type of print sheet according to a first printing quality required for the meeting material that is determined as not an external material, determines a second type of print sheet according to a second printing quality required for the meeting material that is determined as an external material, and determines a third of print sheet according to a third printing quality required for the meeting material that is determined as a predetermined document type among external materials, the third printing quality being a higher printing quality than the first printing quality and the second printing quality,
a second acquisition portion configured to acquire printing condition information relating to printing conditions that can be set in the plurality of image forming apparatuses, respectively;
a first selection portion configured to select, from among the plurality of image forming apparatuses, an image forming apparatus that satisfies the printing condition determined by the printing condition determination portion, based on the printing condition information acquired by the second acquisition portion; and
a print-out portion configured to transmit, to the image forming apparatus selected by the first selection portion, printing data including the material information and the determined printing condition, to cause the image forming apparatus to execute printing.

10. The information processing system according to claim 9, wherein
the meeting information includes at least one of: a subject of the meeting; a category of the meeting; date and time when the meeting is held; members who attend the meeting; a place where the meeting is held; and a summary of the meeting, which are included in the meeting information, and
wherein the printing condition determination portion determines the meeting material to be an external material when any of the following conditions is satisfied; a name of another company is shown in a title or summary column; a term indicating a visitor is included in a category column; and the place where the meeting is held is a reception room, determines the meeting material to be a predetermined document type when a name of the meeting material included in the material information includes a term indicating that the meeting material is a predetermined document type, and determines a type of print sheet according to a printing quality required for the meeting material as determined.

11. The information processing system according to claim 9, wherein
the first acquisition portion reads out and acquires the management data from the storage portion.

12. The information processing system according to claim 9, further comprising:
a third acquisition portion configured to acquire positional information relating to an installation position of each of the plurality of image forming apparatuses; and
a second selection portion configured to, when a plurality of image forming apparatuses that satisfy the determined type of print sheet are selected from among the plurality of image forming apparatuses by the first selection portion, select one image forming apparatus based on the positional information acquired by the third acquisition portion.

13. The information processing system according to claim 12, wherein
the print-out portion transmits the printing data to the image forming apparatus selected by the second selection portion to cause the image forming apparatus to execute printing.

* * * * *